United States Patent [19]
Wolf

[11] Patent Number: 5,912,314
[45] Date of Patent: Jun. 15, 1999

[54] REACTION PRODUCT OF MIXED URETDIONES AND A DISECONDARY DIAMINE

[75] Inventor: Elmar Wolf, Recklinghausen, Germany

[73] Assignee: Huels Aktiengesellschaft, Marl, Germany

[21] Appl. No.: 08/819,365

[22] Filed: Mar. 17, 1997

[30] Foreign Application Priority Data

Mar. 16, 1996 [DE] Germany .................. 196 10 465

[51] Int. Cl.$^6$ .................. C08G 18/10; C08G 18/79; C08G 18/80; C07D 229/00
[52] U.S. Cl. .................. 528/45; 525/452; 528/59; 528/67; 528/68; 528/73; 540/202; 548/951; 548/952; 564/57; 564/59; 564/60; 564/61
[58] Field of Search .................. 540/202; 528/271, 528/220, 228, 229, 230, 45, 61, 67, 68, 59, 73; 525/452; 548/951, 952; 564/57, 59, 60, 61

[56] References Cited

U.S. PATENT DOCUMENTS

| 3,943,158 | 3/1976 | Dietrich et al. ............... 560/330 |
| 4,483,798 | 11/1984 | Disteldorf et al. ............ 540/356 |
| 4,522,975 | 6/1985 | O'Connor et al. ............. 524/702 |
| 4,912,210 | 3/1990 | Disteldort et al. ............ 540/202 |
| 5,143,994 | 9/1992 | Laas et al. .................... 528/45 |
| 5,410,011 | 4/1995 | Konishi et al. ................ 528/73 |
| 5,503,714 | 4/1996 | Reiners et al. ................ 427/391 |
| 5,663,274 | 9/1997 | Lee et al. ..................... 528/73 |
| 5,773,550 | 6/1998 | Wolf ............................. 528/59 |

FOREIGN PATENT DOCUMENTS

| 0 478 990 | 4/1992 | European Pat. Off. . |
| 0 531 249 | 3/1993 | European Pat. Off. . |
| 0 669 354 | 8/1995 | European Pat. Off. . |

OTHER PUBLICATIONS

Database WPI, Section CH, Week 9606, Derwent Publications Ltd., London, GB; Class A25, AN 96–056031, XP002033463 & JP 07 316 258 A (Asahi Kasei Kogyo KK), Dec. 5, 1995, *Zusammenfassung*.
US4483798–A, Nov. 20, 1984 (8449), Abstract.
DE1670720–A, Jan. 14, 1971 (8439), Abstract.
US5143994–A, Sep. 1, 1992 (9249), Abstract.
US4912210–A, Mar. 27, 1990 (9018), Abstract.

*Primary Examiner*—Rabon Sergent
*Attorney, Agent, or Firm*—Oblon, Spivak, McClelland, Maier & Neustadt, P.C.

[57] ABSTRACT

A Polyaddition product, containing uretdione groups, which is obtainable by reaction of (A) a diisocyanate mixture which contains uretdione groups and comprises (1) at least 40 mol % to not more than 80 mol % of isophorone diisocyanate containing uretdione groups and (2) not more than 60 mol % and not less than 20 mol % of hexamethylene diisocyanate containing uretdione groups, with (B) a disecondary diamine, in an NCO/NH ratio of 1:0.5 to 1:0.9 at room temperature to 60° C. in a solvent which is inert towards isocyanates.

20 Claims, No Drawings

REACTION PRODUCT OF MIXED URETDIONES AND A DISECONDARY DIAMINE

BACKGROUND OF THE INVENTION

1. Field of the Invention

The invention relates to novel polyaddition compounds of disecondary diamines and of polyisocyanate mixtures comprising uretdione diisocyanates and based on hexamethylene diisocyanate (HDI) and isophorone diisocyanate (IPDI).

2. Description of the Background

DE-OS 30 30 572 (equivalent to U.S. Pat. No. 4,483,798) describes polyaddition products which contain uretdione groups and have since acquired economic importance for the preparation of PUR powders which are free from blocking agents. These polyaddition products are of an isophorone diisocyanate, which is free from isocyanurate groups and contains uretdione groups, reacted with a diol, the addition product thus obtained optionally being completely or partiy reacted with monoalcohols or monoamines.

Corresponding polyaddition products based on a uretdione, containing NCO groups of hexamethylene diisocyanate (abbreviated to HDI-uretdione in the following) are not possible, as described in EP 0 478 990 (p. 2, lines 38–40) (equivalent to U.S. Pat. No. 5,143,994).

Such products would represent a welcome enrichment of the PUR powder hardeners which already exist, since with these it would be possible for PUR powders to be tailor-made in terms of flexibility in a simple manner.

The object of the present invention was thus to provide polyaddition compounds which are based on HDI-uretdione and are suitable as PUR powder hardeners.

It has been possible to achieve is object with the polyaddition compounds according to the invention described below.

SUMMARY OF THE INVENTION

The present invention thus relates to a polyaddition product, containing uretdione groups, which is obtainable by reaction of (A) a diisocyanate mixture which contains uretdione groups and comprises (1) at least 40 mol % to not more than 80 mol % of isophorone diisocyanate containing uretdione groups and (2) not more than 60 mol % and not less than 20 mol % of hexamethylene diisocyanate containing uretdione groups, with (B) a disecondary diamine, in an NCO/NH ratio of 1:0.5 to 1:0.9 at room temperature to 60° C. in a solvent which is inert towards isocyanates.

DETAILED DESCRIPTION OF THE INVENTION

The diisocyanate mixture containing uretdione groups employed according to the invention comprises at least 40 mol % and not more than 80 mol % of isophorone diisocyanate containing uretdione groups (abbreviated to IPDI uretdione in the following) and not more than 60 mol % and not less than 20 mol % of HDI-uretdione, preferably 50 mol % of IPDI-uretdione and 50 mol % of HDI-uretdione.

The IPDI-uretdione is prepared in accordance with the disclosure of DE-OS 37 39 549 (equivalent to U.S. Pat. No. 4,912,210); it comprises ≦1% of IPDI and 17–18% of NCO, the NCO content being 37.6% after heating at 180° C. (1 hour). The HDI-uretdione is prepared in accordance with the disclosure of DE-OS 16 70 720; it comprises ≦1% of HDI and 22–23% of NCO, the NCO content being 35–36% after heating at 180° C. (1 hour). While the IPDI-uretdione was prepared in-house, a commercially obtainable product (DESMODUR N 3400 from Bayer) was employed for the HDI-uredione.

The reaction of the IPDI/HDI-uretdione with the disecondary diamine is carried out in solution, preferably at room temperature. The disecondary diamine is added in portions at room temperature to the dissolved IPDI/HDIuretdione in the stated ratios of amounts such that the temperature of the reaction mixture does not exceed 40° C. When the addition of the diamine has ended, the reaction has ended, and in the case where the reaction products contain free NCO groups, the solvent, which is preferably acetone, is removed by distillation in evaporating screws, filmtruders or spray dryers. If all or same of the free NCO groups of the reaction products are to be reacted with monoamines, the monoamine is added at room temperature immediately after the chain-lengthening with the disecondary diamine. After the addition of the monoamine, the solvent is removed as already described. However, the reverse procedure can also be followed, i.e. the monoamine is thus first metered in and the disecondary diamine is then added. It has proved particularly advantageous to add the amines together as a mixture to the IPDI/HDI-uretdione. If all or some of the free NCO groups of the reaction products are to be reacted with monoalcohols, when the addition of the diamine has ended, the monoalcohol is added to the reaction mixture and the mixture is heated at 60° C. until 1 NCO equivalent per OH equivalent employed has reacted. The solvent is removed as already described.

The diamines to be employed according to the invention are disecondary diamines which are prepared in two stages, an aliphatic or (cyclo)aliphatic diamine having two primary amino groups being subjected to a condensation reaction with an aldehyde or ketone to give the Schiff's base in the 1st stage, and the Schiff's base being hydrogenated in the 2nd stage. All aliphatic and (cyclo)aliphatic diamines, such as, for example, ethylenediamine, 1,2-diaminopropane, 2-methylpentamethylenediamine, hexamethylenediamine, 2,2,4(2,4,4)-trimethylhexamethylenediamine (TMD), isophorone-diamine (IPD), 1,2-diaminocyclohexane and 1,3-bis(aminomethyl)-benzene, are in principle possible for the condensation reaction to give the Schiff's base.

All aliphatic and (cyclo)aliphatic aldehydes and ketones are in principle possible as the carbonyl compound to be employed for preparation of the Schiff's base; however, isobutyraldehyde, 2-ethylhexanal, methyl ethyl ketone, methyl isobutyl ketone, diisobutyl ketone, cyclohexanone and 3,5,5-trimethylcyclohexanone are preferably employed. A particularly advantageous variant of the process according to the invention comprises employing disecondary diamines, such as are obtained by reaction of diprimary diamines with acrylic acid esters, such as, for example, methyl, ethyl, butyl or 2-ethylhexyl acrylate.

The reaction of the diamine with the acrylic acid ester is carried out at 60–80° C. in a molar ratio of 1:2.

The present invention furthermore relates to polyaddition products of a hexamethylene diisocyanate/isophorone diisocyanate mixture, which contains uretdione groups, and disecondary diamines, which are completely or partly blocked by monoalcohols and/or monoamines.

All aliphatic and (cyclo)aliphatic monoalcohols and monoamines are in principle possible for blocking the ends of the free NCO groups of the polyaddition compounds prepared according to the invention; n-butanol, 2-ethylhexanol, butylamine, hexylamine, 2-ethylhexylamine, dibutylamine and dihexylamine are preferably employed.

The polyaddition products according to the invention, that is to say 1. adducts with terminal free NCO groups;
2. those in which all or some of the NCO groups are reacted with monoalcohols or monoamines in general compounds of molecular weight range of 1200–10000, preferably 2500–6500. The polyaddition products have a melting point of 70–150° C., preferably 80–130° C.; their latent NCO content, the NCO content which forms on heating, is 8–18%, preferably 10–16%.

The compounds according to the invention are particularly suitable as hardeners for compounds of higher functionality (thermoplastic compounds) containing Zerewitdnoff-active hydrogen atoms. In combination with such compounds, the polyaddition products according to the invention form systems which can be cured to high-grade plastics above 160° C., preferably 180° C. The most important field of use of such systems is their use for PUR powder coatings.

Having generally described this invention, a further understanding can be obtained by reference to certain specific examples which are provided herein for purposes of illustration only and are not intended to be limiting unless otherwise specified.

EXAMPLES

A) Preparation of starting compounds for the compounds according to the invention 1. NCO component For the preparation with the disecondary diamines, an IPDI/HDI-uretdione mixture of:

a) 1 NCO equivalent of IPDI-uretdione, which was prepared according to the process described in DE-OS 37 39 549 and had an NCO content of 17.6%; after heating at 180° C. (1 hour), the NCO content was 37.5% b) 1 NCO equivalent of HDI-uretdione (DESMODUR N 3400) having an NCO content of 22%; after heating at 180° C. (1 hour), the NCO content was 36% was employed.

The molecular weight of the HDI/IPDI-uretdione mixture is 429 and is based on the sum of the two NCO equivalents.

2. Preparation of the disecondary diamine

General Preparation instructions

The N,N'-disubstituted diamines are prepared in two stages:

In the 1st stage, the aldehyde or the ketone is added dropwise to the diamine (molar ratio 2:1), while stirring intensively, such that the temperature of the reaction mixture does not rise above 40° C. After the addition of the aidehyde or ketone, the mixture is stirred at 40° C. for a further hour. The aqueous phase is then separated off from the organic phase. To remove the residual water, the organic phase is heated at 60° C. under 10 mbar until no further $H_2O$ passes over. In the 2nd stage, the di-Schiff's base is hydrogenated on a contact co-catalyst at 125° C. under 300 bar. The crude product is then distilled.

Table 1 below shows Example Nos. 1–4, each example exemplifying a disecondary diamine made according to the above description.

TABLE 1

| | Starting compounds | | Reaction product Amine | |
|---|---|---|---|---|
| Example No. | Diamine | Carbonyl component | content [mmol/g] | Purity (GC) |
| 1 | TMD | diisobutyl ketone | 4.9 | >98 |
| 2 | TMD | methyl isobutyl ketone | 6.4 | >99 |
| 3 | IPD | i-butyraldehyde | 7.1 | >98 |
| 4 | IPD | methyl isobutyl ketone | 5.9 | >98 |

Preparation of the compounds according to the invention

General preparation instructions

The disecondary diamine is metered into the acetone solution (about 50% strength) of the IPDI/HDI-uretdione mixture at room temperature, while stirring intensively, such that the temperature of the reaction solution does not exceed 40° C. When the addition of the diamine has ended, the reaction has practically ended, and the acetone is removed. If the free NCO groups of the HDI/IPDI-uretdione/diamine addition product (molar ratio: HDI/IPDI-uretdione:diamine=(n+1):n) are to be blocked with monoamines, the monoamine is added immediately after the addition of the diamine. When the addition of the monoamine has ended, the acetone is removed.

If the free NCO groups of the HDI/IPDI-uretdione/diamine addition product are to be blocked with monoalcohols, the following procedure has proved to be advantageous:

When the addition of the diamine has ended, the monoalcohol and 0.05% by weight of dibutyl tin diaurate (DBTL) (based on the solution) are added; the mixture is heated at 60° C. until 1 NCO equivalent per OH equivalent has reacted Table 2 below shows Example Nos. 5–10, each example exemplifying a polyaddition compound made according to the above description.

TABLE 2

| | Composition | | | | | |
|---|---|---|---|---|---|---|
| | | mol | | | % NCO after | |
| Example No. | IPDI/HDI-uretdione | Disecondary amine | Blocking agent | % NCO | heating at 180° C. | Melting point °C. |
| 5 | 4 | 3A. 2.1 | — | 2.6 | 12.5 | 68–81 |
| 6 | 5 | 4A. 2.2 | — | 2.3 | 12.7 | 87–98 |
| 7 | 5 | 4A. 2.3 | — | 2.4 | 13.2 | 138–144 |
| 8 | 5 | 4A. 2.3 | 2 $C_8H_{17}$—OH | 0.4 | 9.8 | 120–126 |

TABLE 2-continued

| | Composition | | | | % NCO after | |
|---|---|---|---|---|---|---|
| | | mol | | | | |
| Example No. | IPDI/HDI-uretdione | Disecond-ary amine | Blocking agent | % NCO | heating at 180° C. | Melting point °C. |
| 9 | 10 | 9A. 2.3 | 2 C$_8$H$_{17}$—OH | 0.3 | 10.1 | 127–133 |
| 10 | 10 | 9A. 2.4 | 2 HN (C$_4$H$_9$)$_2$ | 0.2 | 9.3 | 123–129 |

In Table 2, in the column "Disecondary amine", the number before "A.2." refers to the number of moles of disecondary amine; the number after "A.2." refers to the Example No. from Table 1. Thus, for examples "A. 2.1" in Table 2 means the disecondary amine which was produced from 1 mole TMD and 2 moles diisobutyl ketone and subsequent hydrogenation.

The disclosure of German priority patent application 196 10 465.3, filed Mar. 16, 1996, is hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured By Letters Patent of the United States is:

1. A polyaddition product, containing uretdione groups, which is prepared by reacting (A) a diisocyanate mixture which contains uretdione groups and comprises (1) at least 40 mol. % to not more than 80 mol. % of isophorone diisocyanate containing uretdione groups and (2) not more than 60 mol. % and not less than 20 mol. % of hexamethylene diisocyanate containing uretdione groups, the mol. % amounts based on the total molar amount of diisocyanate mixture (A), with (B) a disecondary diamine, in an NCO/NH ratio of 1:0.5–1:0.9 at room temperature to 60° C. in a solvent which is inert towards isocyanates.

2. The polyaddition product as claimed in claim 1, wherein the polyaddition product is completely or partly blocked with a blocking agent selected from at least one of monoalcohols and monoamines.

3. The polyaddition product as claimed in claim 1, wherein the disecondary diamine is prepared by condensation of a diamine selected from the group consisting of ethylenediamine, 1,2-diaminopropane, 2-methylpentamethylenediamine, hexamethylenediamine, 2,2,4(2,4,4)-trimethylhexamethylenediamine, isophoronediamine (IPD), 1,2diaminocyclohexane and 1,3-bis(aminomethyl)-benzene with a carbonyl-containing compound selected from the group consisting of isobutyraldehyde, 2-ethylhexanal, methyl ethyl ketone, methyl isobutyl ketone, diisobutyl ketone, cyclohexanone and 3,5,5-trimethylcyclohexanone, to form a Schiff's base, and subsequent hydrogenation of the Schiff's base.

4. The polyaddition product as claimed in claim 2, wherein the disecondary diamine is prepared by condensation of a diamine selected from the group consisting of ethylenediamine, 1,2-diaminopropane, 2-methylpentamethylenediamine, hexamethylenediamine, 2,2,4(2,4,4)-trimethylhexamethylenediamine, isophoronediamine (IPD), 1,2diaminocyclohexane and 1,3-bis(aminomethyl)-benzene with a carbonyl-containing compound selected from the group consisting of isobutyraldehyde, 2-ethylhexanal, methyl ethyl ketone, methyl isobutyl ketone, diisobutyl ketone, cyclohexanone and 3,5,5-trimethylcyclohexanone, to form a Schiff's base, and subsequent hydrogenation of the Schiff's base.

5. The polyaddition product as claimed in claim 1, wherein the disecondary diamine is prepared by reacting a diprimary diamine with an acrylic acid ester.

6. The polyaddition product as claimed in claim 2, wherein the disecondary diamine is prepared by reacting a diprimary diamine with an acrylic acid ester.

7. The polyaddition product as claimed in claim 5, wherein the acrylic acid ester is methyl, ethyl, butyl or 2-ethylhexyl acrylate.

8. The polyaddition product as claimed in claim 6, wherein the acrylic acid ester is methyl, ethyl, butyl or 2-ethylhexyl acrylate.

9. The polyaddition product as claimed in claim 1 which has a molecular weight range of 1200–10000, a melting point of 70–150° C., and a latent NCO content of 8–18%.

10. The polyaddition product as claimed in claim 2 which has a molecular weight range of 1200–10000, a melting point of 70–150° C., and a latent NCO content of 8–18%.

11. The polyaddition product as claimed in claim 1 which has a molecular weight range of 2500–6500, a melting point of 80–130° C., and a latent NCO content of 10–16%.

12. The polyaddition product as claimed in claim 2 which has a molecular weight range of 2500–6500, a melting point of 80–130° C., and a latent NCO content of 10–16%.

13. The polyaddition product as claimed in claim 2, wherein the blocking agent is selected from the group consisting of n-butanol, 2-ethylhexanol, butylamine, hexylamine, 2-ethylhexylamine, dibutylamine dihexylamine.

14. The polyaddition product as claimed in claim 4, wherein the blocking agent is selected from the group consisting of n-butanol, 2-ethylhexanol, butylamine, hexylamine, 2-ethylhexylamine, dibutylamine dihexylamine.

15. The polyaddition product as claimed in claim 6, wherein the blocking agent is selected from the group consisting of n-butanol, 2-ethylhexanol, butylamine, hexylamine, 2-ethylhexylamine, dibutylamine dihexylamine.

16. The polyaddition product as claimed in claim 8, wherein the blocking agent is selected from the group consisting of n-butanol, 2-ethylhexanol, butylamine, hexylamine, 2-ethylhexylamine, dibutylamine dihexylamine.

17. A process for the preparation of a polyaddition product, containing uretdione groups, which comprises reacting (A) a diisocyanate mixture which contain s uretdione groups and comprises (1) at least 40 mol % to not more than 80 mol % of isophorone diisocyanate containing uretdione groups and (2) not more than 60 mol % and not less than 20 mol % of hexamethylene diisocyanate containing uretdione groups, the mol. % amounts based on the total molar amount of diisocyanate mixture (A), with (B) a disecondary diamine, in an NCO/NH ratio of 1:0.5–1:09 at room temperature to 60° C. in a solvent which is inert towards isocyanates, and optionally further reacting the polyaddition product thus obtained, completely or partly, with at least one blocking agent selected from the group consisting of monoalcohols and monoamines.

18. A method of hardening a compound which is at least difunctional and contains Zerewittinoff-active hydrogen atoms, which comprises reacting said compound with the polyaddition product as claimed in claim 1.

19. A method of hardening a compound which is at least difunctional and contains Zerewittinoff-actve hydrogen atoms, which comprises reacting said compound with the polyaddition product as claimed in claim 2.

20. A composition for use in a polyurethane powder coating comprising the polyaddition product claimed in claim 1 and a hardener which is at least difunctional and contains Zerewittinoff-active hydrogen atoms.

* * * * *